United States Patent
Duetta et al.

(10) Patent No.: US 12,400,013 B2
(45) Date of Patent: Aug. 26, 2025

(54) GUIDED NAVIGATION OF ELECTRONIC DOCUMENTS

(71) Applicant: GYDME INC., Hamilton (CA)

(72) Inventors: Colin Duetta, Binbrook (CA); Michael Salvatori, Burlington (CA); Brandon Heaslip, Guelph (CA)

(73) Assignee: GYDME INC., Hamilton (CA)

( * ) Notice: Subject to any disclaimer, the term of this patent is extended or adjusted under 35 U.S.C. 154(b) by 337 days.

(21) Appl. No.: 17/841,199

(22) Filed: Jun. 15, 2022

(65) Prior Publication Data

US 2022/0405414 A1 Dec. 22, 2022

Related U.S. Application Data

(60) Provisional application No. 63/211,934, filed on Jun. 17, 2021.

(51) Int. Cl.
   *G06F 21/62* (2013.01)
   *G06F 9/451* (2018.01)
   *G06F 16/27* (2019.01)

(52) U.S. Cl.
   CPC .......... *G06F 21/6218* (2013.01); *G06F 9/453* (2018.02); *G06F 16/27* (2019.01)

(58) Field of Classification Search
   None
   See application file for complete search history.

(56) References Cited

U.S. PATENT DOCUMENTS

| | | | |
|---|---|---|---|
| 9,565,175 B1* | 2/2017 | Saylor | G06F 21/10 |
| 11,432,149 B1* | 8/2022 | Dhanoa | H04W 12/068 |
| 2006/0195494 A1 | 8/2006 | Dietrich | |
| 2011/0043652 A1* | 2/2011 | King | G06F 40/194 |
| | | | 707/706 |
| 2015/0187034 A1* | 7/2015 | Mullen | G16H 30/20 |
| | | | 235/494 |
| 2015/0193579 A1* | 7/2015 | Bruce | H04L 67/14 |
| | | | 705/2 |
| 2015/0302386 A1* | 10/2015 | Chander | G06F 16/951 |
| | | | 705/35 |
| 2016/0063185 A1* | 3/2016 | Yang | G06Q 10/10 |
| | | | 705/3 |
| 2016/0092442 A1 | 3/2016 | Gillett et al. | |
| 2016/0139035 A1* | 5/2016 | Florescu | B01L 3/561 |
| | | | 506/40 |
| 2016/0261658 A1 | 9/2016 | Taylor et al. | |
| 2017/0270249 A1* | 9/2017 | Beerling | H04W 12/06 |

(Continued)

*Primary Examiner* — Kaveh Abrishamkar
(74) *Attorney, Agent, or Firm* — Perry + Currier

(57) ABSTRACT

A system identifies a reference document and an associated explanatory document, the reference document containing information to support an explanation contained in the explanatory document. The system provides control of navigation of the reference document to a first electronic device. The system initiates a local authorization of a second electronic device to authorize the second electronic device to display the explanatory document when the second electronic device is detected as physically proximate the first electronic device. If the local authorization is successful, the system synchronizes passive navigation of the explanatory document at the second electronic device with the navigation of the reference document at the first electronic device.

20 Claims, 6 Drawing Sheets

(56) References Cited

U.S. PATENT DOCUMENTS

| | | | |
|---|---|---|---|
| 2018/0360410 A1* | 12/2018 | Sun | G16H 30/20 |
| 2019/0348169 A1* | 11/2019 | Gibby | G16H 30/40 |
| 2020/0388380 A1* | 12/2020 | Romanychev | G06K 19/06037 |
| 2021/0233644 A1* | 7/2021 | Hansis | G16H 40/20 |
| 2021/0257108 A1* | 8/2021 | Rong | G16H 10/60 |
| 2022/0361755 A1* | 11/2022 | Stanley | G16H 40/67 |
| 2022/0366562 A1* | 11/2022 | Yu | G06T 7/0012 |

* cited by examiner

GUIDED NAVIGATION OF ELECTRONIC DOCUMENTS

BACKGROUND

Documents are often used during face-to-face consultations and other discussions between people. For example, during a patient consultation, a healthcare professional, such as a physician, may reference a document that contains information concerning a medical product, such as a prescription drug, to aid the patient's understanding of the medical product.

DETAILED DESCRIPTION

Figure 1:
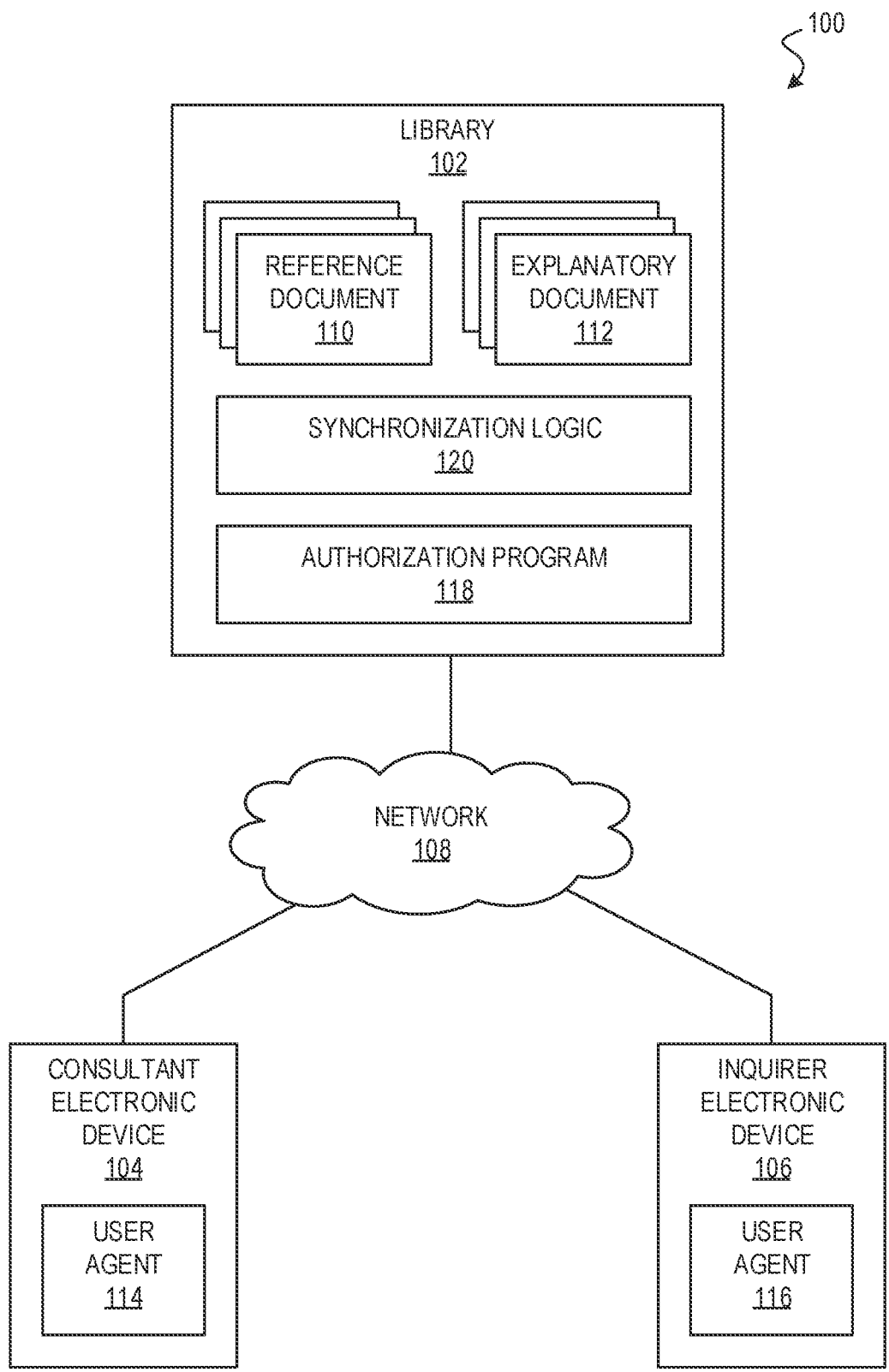
FIG. 1 is a block diagram of an embodiment of a system for dissemination of documents for synchronized navigation.

A face-to-face consultation, discussion, or other face-to-face interaction (henceforth "consultation") may be an essential component to certain practices, such as the medical practice, the professional dissemination of medical knowledge, the prescribing of medications, and other healthcare services. However, it is often the case that the document used to assist in such a service is a physical document, such as a brochure, booklet, flipchart, pamphlet, or the like.

These documents are susceptible to becoming out-of-date and may be inconvenient to store, especially in large quantities. Moreover, some patients may be hesitant to handle these documents, in view of a perception, whether valid or not, that the document may bear a communicable disease or may be unsanitary.

Described herein are techniques to provide electronic documents for in-person consultations to solve one or more of these problems and further to improve the dissemination of professional advice and knowledge. As will be discussed in greater detail, an electronic reference document and an electronic explanatory document are provided. The person ("consultant") giving a consultation views the reference document on an electronic device, while the receiving person, such as a patient, client, or inquirer ("inquirer"), views the explanatory document on a separate electronic device and may indeed never see the reference document. The reference document contains information relevant to the consultant, and such information may be highly technical in nature. The explanatory document contains information that is relatively easy to understand by the layperson and that is supported by the information contained in the reference document. The consultant controls navigation of both the reference document and explanatory document from their device. The inquirer views the explanatory document as a form of guided presentation by the consultant, so that the dissemination of information may be carefully controlled and performed properly, such as in accordance with professional medical standards, best practices, and/or legal requirements. The consultant may interpret the technical information in the reference document for the inquirer as they view the explanatory document, so as to convey understanding to the inquirer.

The electronic device used by the inquirer may be their personal device, such as their own smartphone or tablet. Fear or contamination may thus be mitigated.

Authorization for the inquirer to view the explanatory document may be highly localized to maintain controlled access to information, while taking advantage of the natural tendency for doctor and patient, for example, to recognize each other or be capable of performing an out-of-band authentication. Further, the natural setting of such a consultation is respected, which may benefit both doctor and patient.

The reference document and explanatory document may provide for communication between the consultant and inquirer, such as via highlighting by the consultant or via monitoring of the viewing behavior of the inquirer.

A library of reference documents and corresponding explanatory documents may be maintained, where such documents may be downloaded to the devices in real time. The library may store various versions of documents in different languages and other features tailored to specific groups of inquirers.

These and other features and advantages of the techniques disclosed herein will be discussed in greater detail with reference to the embodiments described herein.

FIG. 1 shows a system 100 for dissemination of documents for synchronized navigation. The system 100 include a library 102 of electronic documents, a first (consultant) electronic device 104, a second (inquirer) electronic device 106, and a computer network 108 via which the library 102 and devices 104, 106 may communicate. The computer network 108 may include the internet, a local-area network (LAN), a wireless or mobile network, and similar.

The library 102 may include a server or other computing device that includes a processor, memory, storage device, and network interface to store reference documents 110 and explanatory documents 112 and transfer such documents 110, 112 to the respective devices 104, 106. The functionality discussed herein may be performed by any combination of the library 102 and devices 104, 106. For example, the library 102 may host a script that is communicated to a device 104, 106 to fully or partially carry out a function. Alternatively or additionally, the library 102 may run a script or program to fully or partially carry out the same function or a different function. Web browser-based technologies such as WebSocket may be used.

The library 102 may execute an authorization program 118 to authorize the devices 104, 106 to receive the documents 110, 112. The authorization program 118 may allow for login by a user of a device 104, 106 and further may authenticate the user, for example, by way of a username and password, digital certificate, or similar credentials. In this embodiment, consultants are provided with login credentials to authorize access to reference documents 110 and explanatory documents 112. Further, inquirers may not be provided with login credentials, so that their access to explanatory documents 112 is dependent upon the consultant's access to the documents 110, 112.

Each electronic device 104, 106 may be a smartphone, tablet computer, or similar computing device that includes a processor, memory, storage device, and network interface to communicate with the library 102 via the network 108. The electronic devices 104, 106 may also communicate with each other via the network 108 or directly, such as via a camera and display.

Each electronic device 104, 106 may include a respective user agent program 114, 116, such as a web browser, specialized application, or similar program capable of receiving and displaying a respective document 110, 112.

At the consultant electronic device 104, the user agent 114 may control navigation of a reference document 112 downloaded from the library 102. An explanatory document 112 corresponding to the reference document 110 may be made accessible to the inquirer electronic device 106, and the user agent 116 at that device 106 may display the explanatory document 112. The reference document 110 may include navigation logic, such as an ordering of pages, which allows the reference document 110 to be browsed at the user agent 114 of the consultant electronic device 104. Navigation logic may be internal to the reference document.

An explanatory document 112 may be related to the corresponding reference document 110 by synchronization logic 120 that may be stored at the library 102. The synchronization logic 120 links the pages of the explanatory document 112 to the reference document 110. When the user agent 114 at the consultant electronic device 104 is used to select a page for the reference document 110, the consultant device 104 communicates an indication of that page to the library 102, which applies the synchronization logic 120 to obtain a corresponding page for the explanatory document 112. The library 102 then communicates an indication of that page to the inquirer electronic device 106, so that user agent 116 automatically controls the explanatory document 112 to navigate to that page. In various examples, the library 102 communicates the page of the explanatory document 112 when that page is identified by the synchronization logic 120. In other examples, the entire explanatory document 112 is downloaded to the inquirer electronic device 106, and the synchronization logic 120 communicates a page number or other identifier to the inquirer electronic device 106 when a particular page it to be displayed, so that the user agent 116 switches to that particular page. As such, the inquirer may experience passive navigation of the explanatory document 112 at their device 106 as controlled by the consultant's active navigation of the reference document at their device 104.

Multiple versions of an explanatory document 112 may be associated with the same reference document 110. For example, explanatory documents 112 in different languages, of different reading levels, for different sightedness (e.g., large print, high contrast), with different cultural contexts, with different formatting, and/or with different branding may be associated with the same reference document 110. This may help tailor consultations to different patients. The library 102 may be configured to receive user input from the consultant, via the consultant electronic device 104, related to a characteristic of the inquirer being consulted via the inquirer electronic device 106, and then select or modify the explanatory document 112 based on the characteristic. The reference document 110 may also be selected or modified similarly. Example characteristics include language fluency, age, cultural background, etc.

Figure 2:
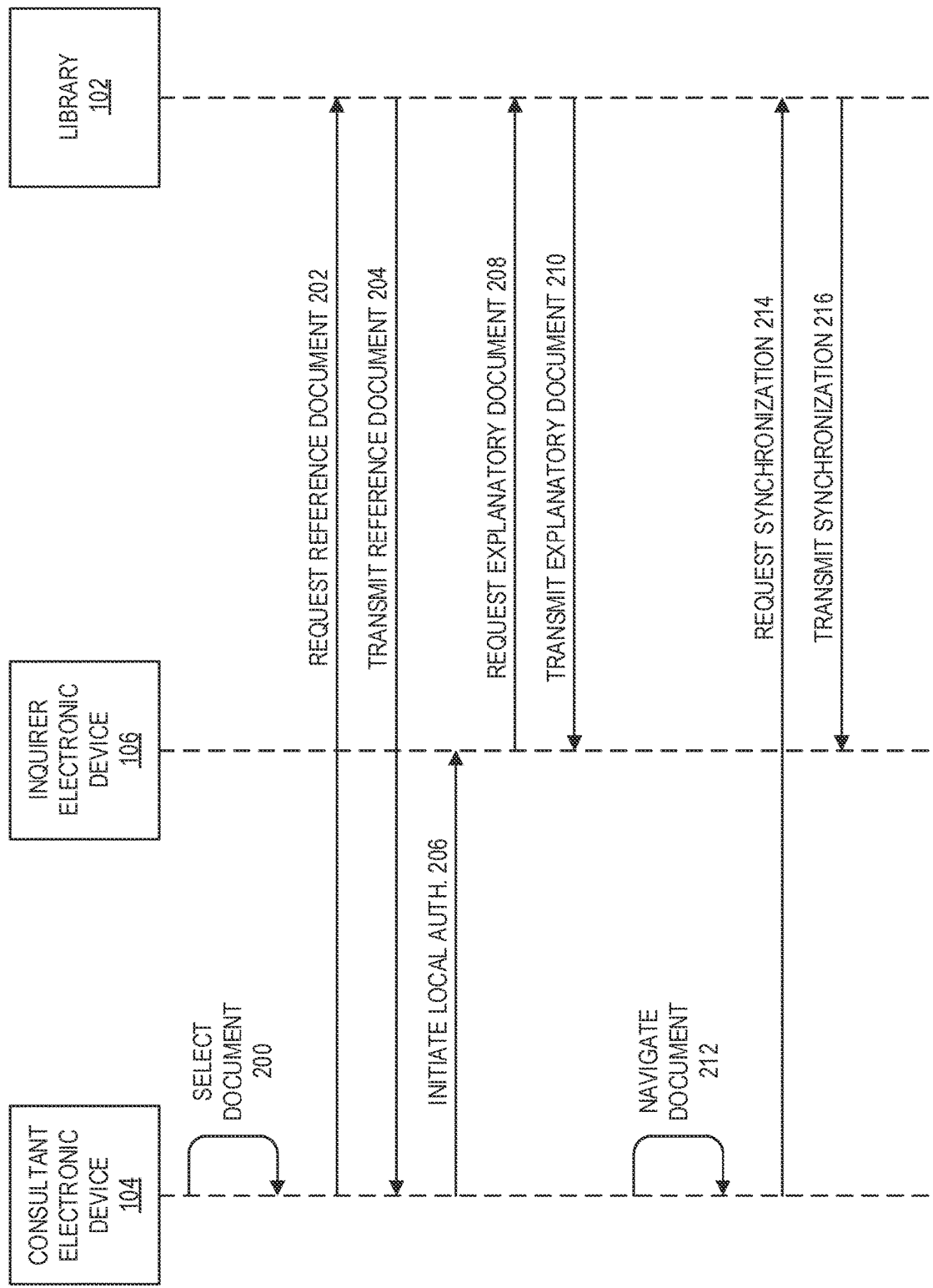
FIG. 2 is a signal diagram of an example of synchronized navigation of documents.

FIG. 2 shows how, in this embodiment, corresponding reference and explanatory documents are obtained and, further, how navigation of these documents is synchronized. An illustrative example has a doctor in possession of their consultant electronic device 104 as they are about to inform a patient, who has their inquirer electronic device 106, about a medical product, such as a medication. Both devices 104, 106 are connected to the internet. The doctor directs their device 104 to a library 102 of documents.

The consultant electronic device 104 selects a document, at 200. This may include the consultant selecting a document from a list of available documents provided by the library 102. The consultant may log in to the library 102, thereby identifying themselves as a consultant, and choose a document. As the library 102 maintains a correlation between reference and explanatory documents, the selected reference document and associated explanatory document are thereby identified to the library 102.

The consultant electronic device 104 requests, at 202, the selected reference document from the library 102.

The library 102 responds by transmitting, at 204, the selected reference document or a portion thereof, such as the first page, to the consultant electronic device 104. The library 102 may generate a code for the consultation and transmit the code with the selected reference document to the consultant electronic device 104. In some examples, only the code is communicated, at 204, at this time, and pages of the selected reference document may be transmitted at a later time. In some examples, a Uniform Resource Locator (URL) of the reference document is transmitted to the consultant electronic device 104, and such a URL may include a code.

The consultant electronic device 104 may, at 206, initiate local authorization of the inquirer electronic device 106 to authorize the inquirer electronic device 106 to display the explanatory document. The doctor in this example has already identified the patient by recognizing them and/or having them go through the process of booking and attending the consultation. The doctor may then locally authorize the guided presentation of the explanatory document to the patient by having the patient demonstrate to the library 102 that they are in physical proximity to the document. This local authorization may be achieved in a number of ways.

The consultant electronic device 104 may display a code for capture by the inquirer electronic device 106. Such a code may have been communicated to the consultant electronic device 104 previously, at 204. For example, the library 102 may generate a code when accepting the request, at 202, from the consultant electronic device 104. The code is known to the library 102 and consultant electronic device 104 and may be shared between the doctor and patient when they are in physical proximity, e.g., in the same consultation room. The code may include a machine-readable code, such as a QR code or barcode, that is rendered by the consultant electronic device 104. The inquirer electronic device 106 may capture the code, such as by using its camera, at the direction of the patient.

In another example, the code may include a human-intelligible code, such as a string of alphanumeric characters. A human-intelligible code may be displayed at the consultant electronic device 104 for viewing by the doctor and/or patient. A human-intelligible code may be wirelessly transmitted to the inquirer electronic device 106 by the library 102 or the consultant electronic device 104. For example, the library may send a Short Message Service (SMS) message to the inquirer electronic device 106. However communicated, the human-intelligible code may be manually typed into the inquirer electronic device 106 by the patient.

A machine-readable code may bear a network address of the library 102 and thus may automatically direct the inquirer electronic device 106 to the library 102. For example, a QR code may embed a URL for the library 102 and the URL may also specify the code specific to the present consultation as a parameter. The inquirer electronic device 106 may be configured to automatically follow links detected in a scanned QR code.

Entry of a human-intelligible code in the form of a string of numbers, letters, symbols, or a combination of such, may first require the inquirer electronic device 106 to be directed to the URL of the library 102. For example, the patient may enter this URL, so as to be presented with a form in which to enter the human-intelligible code.

In whichever manner the code is shared, the inquirer electronic device 106 provides the code to the library 102 in what is a request for the explanatory document, at 208. The library 102 compares its version of the code to the received code and, if they match, grants the inquirer electronic device 106 access to the explanatory document, at 210. This may include transmitting all or a portion of the explanatory document. In some examples, only a URL to the explanatory document is sent to the inquirer electronic device 106.

After local authorization is successful, the reference document may be navigated, at 212. For example, the physician may control the consultant electronic device 104 to display various pages of the reference document according to its navigation logic. The reference document may be navigated along a linear navigation logic from the first page to the last. Forward and backward navigation may be provided, so that the physician may navigate to a previous page for further explanation or clarification. In various examples, a table of contents or index may be provided to allow for random navigation of the reference document. In various examples, hyperlinks may be provided in the reference document for linked navigation among the pages of the reference document. If the page of the reference document being navigated to has not yet been downloaded to the consultant electronic device 104, it may be downloaded at this time.

As the reference document is navigated, the consultant electronic device 104 may, at 214, send to the library 102 a request for synchronization of the explanatory document being viewed on the inquirer electronic device 106 by the patient. A request for synchronization may be communicated whenever the consultant electronic device 104 changes the page of the reference document. A request for synchronization may be inherent to the page selecting methodology implemented by the library 102. For example, each page of the reference document may have a unique URL (e.g., a general URL for the document with a page number as a parameter).

The library responds to such requests for synchronization by transmitting synchronization data to the inquirer electronic device 106, at 216. Synchronization data may take the form of a page number or other identifier of a page of the explanatory document, or, as in the example above, a URL of the specific page of the explanatory document.

Repetition of actions 212-216 defines synchronized passive navigation of the explanatory document as controlled by active navigation of the reference document. The doctor may thus control the presentation of the explanatory document while viewing the reference document, so that the doctor may be prompted to explain technical concepts to the patient based on their knowledge and professional judgment without having to present the reference document to the patient, so that the patient's understanding may be enriched.

Figure 3:
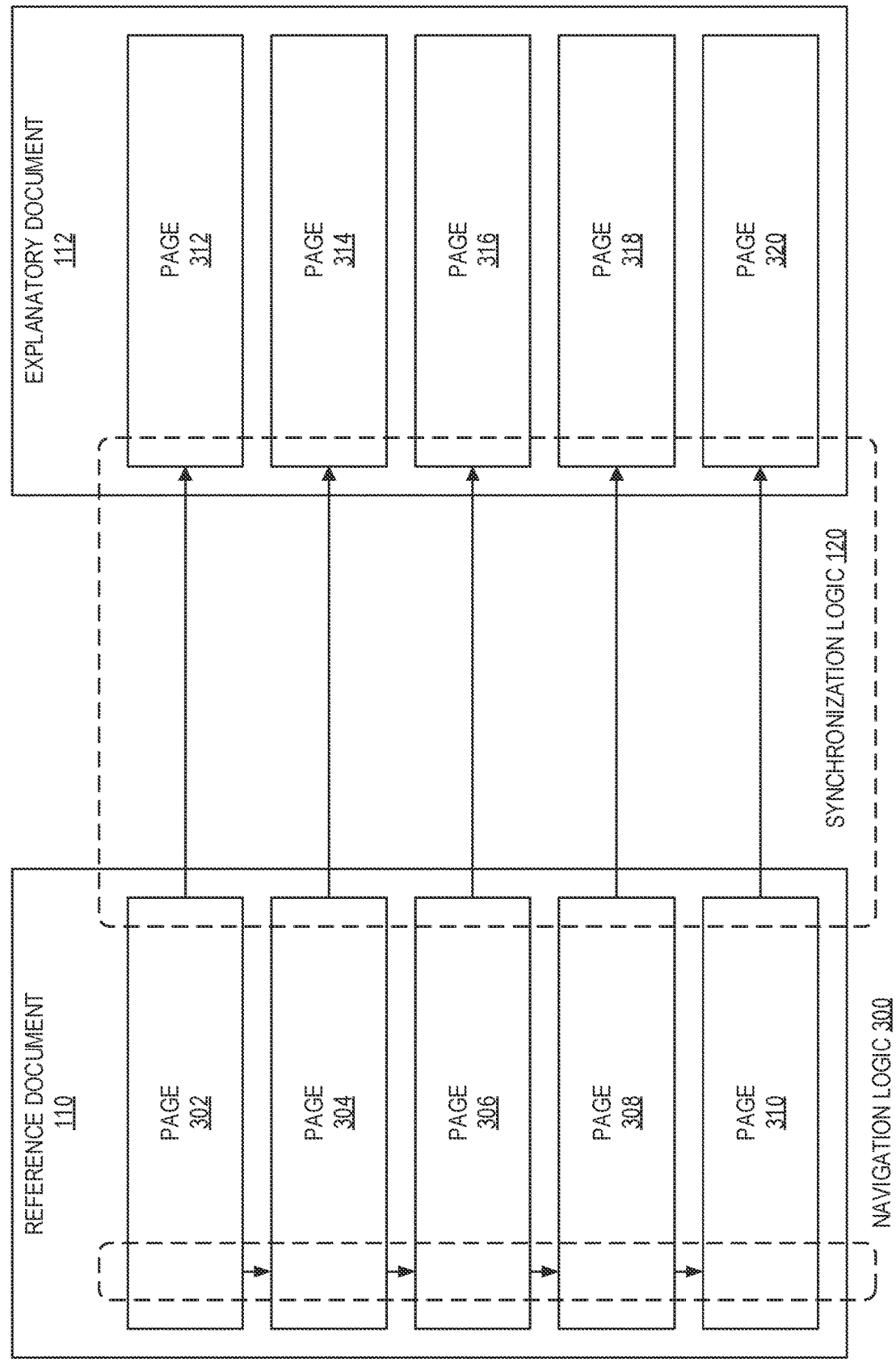
FIG. 3 is a schematic diagram of example reference and explanatory documents with example navigation and synchronization logic.

FIG. 3 shows example reference and explanatory documents 110, 112 with example navigation logic 300 and example synchronization logic 120.

The reference document 110 includes a first group of pages 302-310 and associated navigation logic 300 that governs the navigation of the reference document by associating a current page with a next page. In this example, a linear sequence of pages 302-310 is defined.

The explanatory document 112 includes a second group of pages 312-320, which are linked to the first group of pages 302-310 by the synchronization logic 120. In this example, the synchronization logic 120 identifies a page 312-320 of the second group of pages for each respective page 302-310 of the first group of pages. The synchronization logic 120 thus defines a one-to-one page mapping of the second group of pages to the first group of pages.

The synchronization logic 120 may be contained in the reference document 110 or may be a separate file or data structure.

Figure 4:
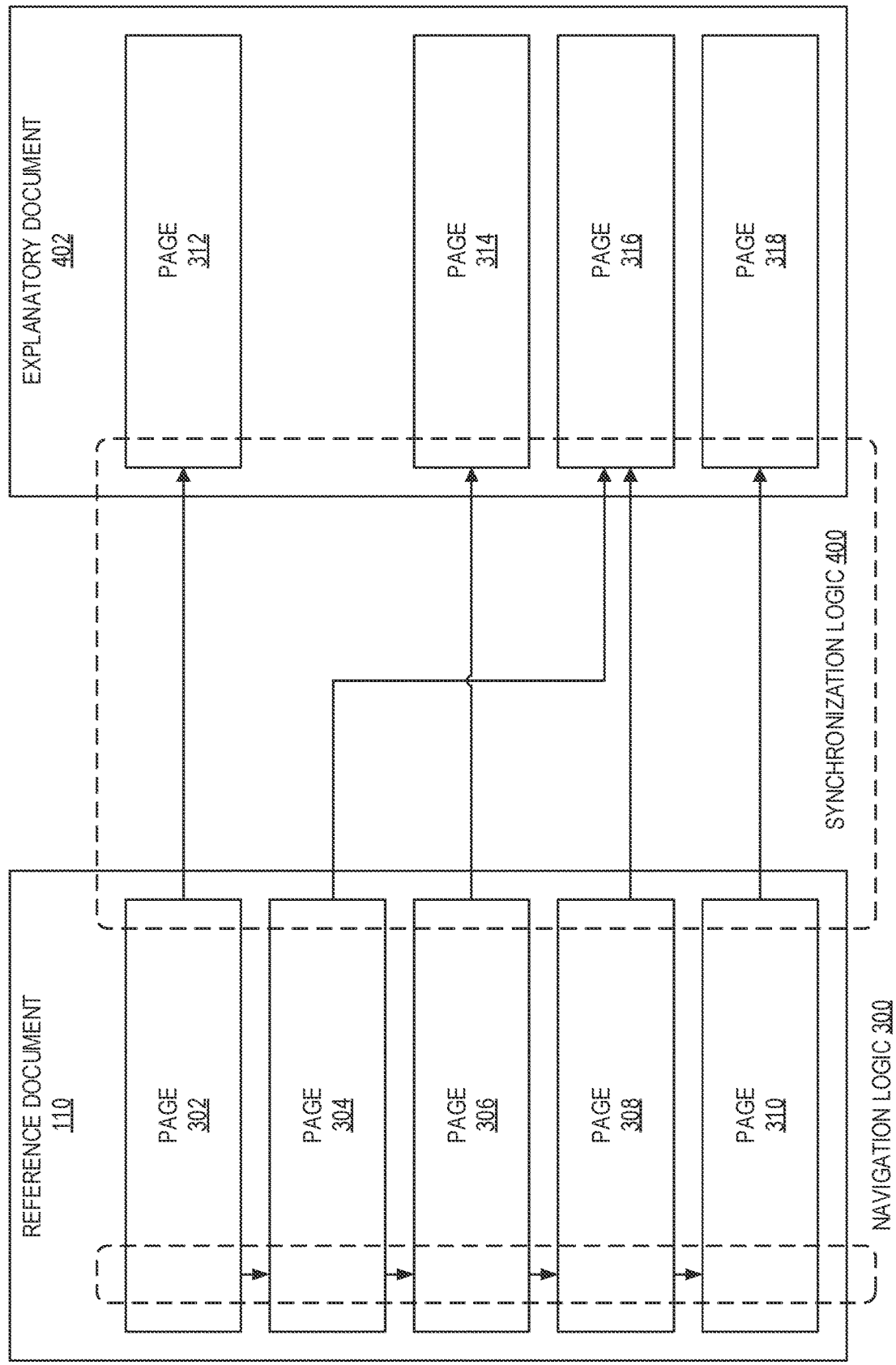
FIG. 4 is a schematic diagram of another example of synchronization logic.

FIG. 4 shows another example of synchronization logic 400 that defines a different mapping among pages of reference and explanatory documents. In this example, an explanatory document 402 includes a page 316 that is correlated to multiple different pages 304, 308 of a reference document 110. Numerous other examples are possible and may accord with one-to-one, many-to-one, one-to-many, and many-to-many page correlation schemes.

Figure 5:
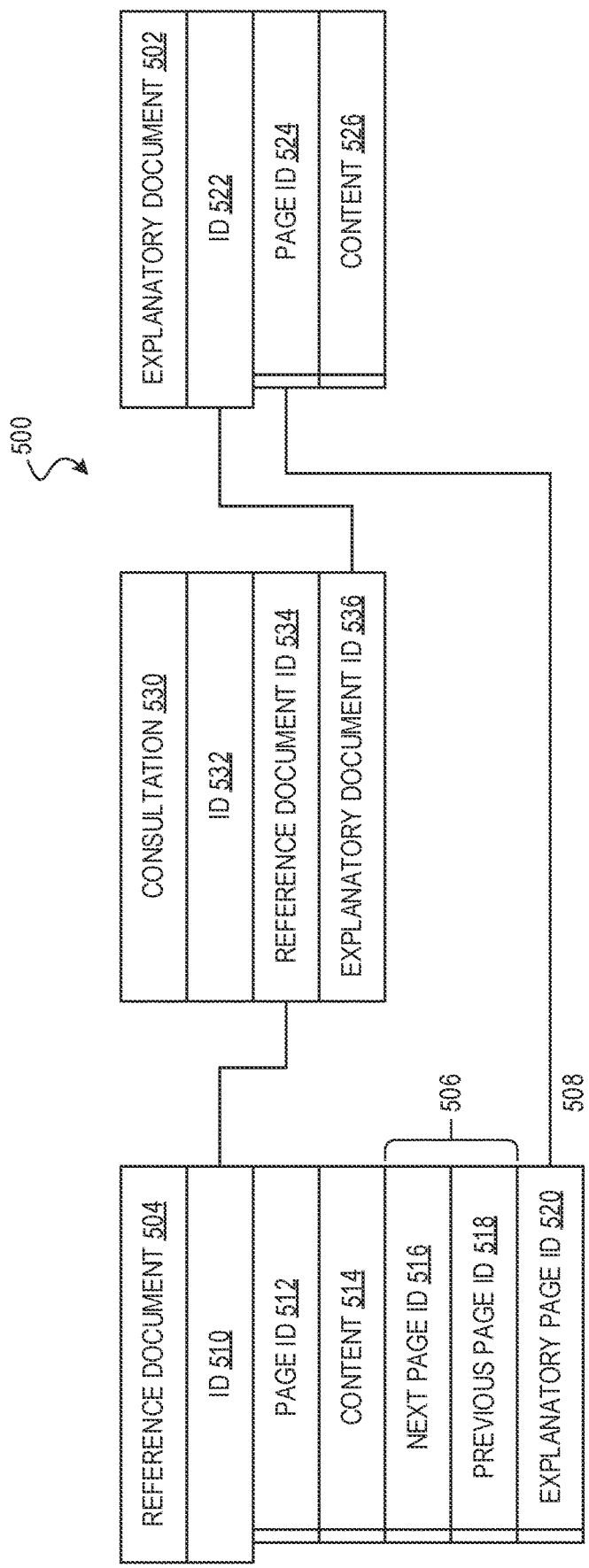
FIG. 5 is a schematic diagram of an example data structure that implements correlated reference and explanatory documents, navigation logic, and synchronization logic.

FIG. 5 shows an example data structure 500 that correlates an explanatory document 502 to a reference document 504 and provides navigation logic 506 and synchronization logic 508. The data structure 500 may be used to implement a database, file structure, or other programmatic structure. The elements shown in FIG. 5 may be implemented with database columns, rows, or fields; fields in a file that uses object notation syntax (e.g., JSON, XML, YML, etc.); a directory structure; or similar.

The reference document 504 may include an identifier 510 to uniquely identify the document 504. Each page of the reference document 504 may include a page identifier 512 to uniquely identify the page, content 514 of the page (e.g., text, image, animation, video, etc.), and next and previous page identifiers 516, 518 which may specify the next and previous page identifiers 512 and thereby define navigation logic 506. The content 514 of the reference document 504 is specifically tailored to the consultant and may include technical information unsuitable for the layperson. Each page of the reference document 504 may further include an explanatory page identifier 520 that defines synchronization logic 508. Any or all of the identifiers 510, 512, 516-520 may be communicated as a URL (e.g., a URL with parameters) and the location specified by the URL may store the respective page content 514.

The explanatory document 502 may include an identifier 522 to uniquely identify the document 502. Each page of the explanatory document 502 may include a page identifier 524 to uniquely identify the page and content 526 of the page (e.g., text, image, animation, video, etc.). The content 526 of the explanatory document 502 is specifically tailored to the layperson inquirer and may summarize technical information in general and understandable language. The content 526 may also include legal disclaimers, safety warnings, advisory messages, etc. Any or all of the identifiers 522, 524 may be communicated as a URL (e.g., a URL with parameters) and the location specified by the URL may store the respective page content 526.

A consultation 530 may be defined to correlate instances of the reference document 504 and the explanatory document 502. The consultation 530 may include a unique identifier 532 that may be or may include a shareable code for the consultation 530. In other examples, an additional data element is included to define the shareable code. The consultation 530 may further include a reference document identifier 534 that identifies the particular reference document 504 used during the consultation 530. The consultation 530 may further include an explanatory document identifier 536 that identifies the particular explanatory document 502 used during the consultation 530. In other examples, the reference document 504 may store the explanatory document identifier 536.

Guided navigation of the explanatory document 502 is facilitated by navigation logic 508 provided by the explanatory page identifier 520 associated with each page of the reference document 504. Hence, when the consultant navigates to a next or previous page of the reference document 504, the respective explanatory page identifier 520 may be used to automatically navigate to the page of the explanatory document 502 without requiring input by the inquirer.

Figure 6:
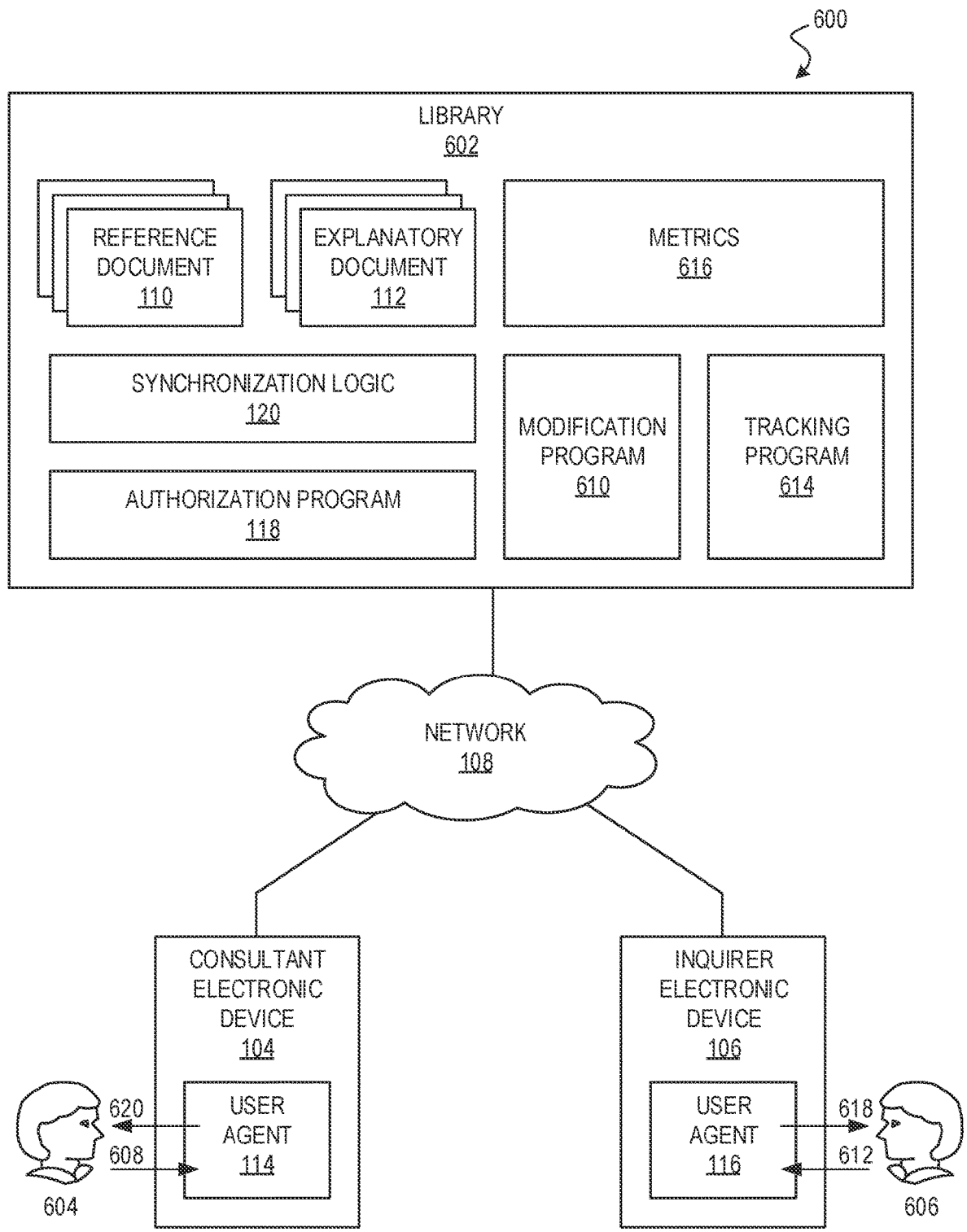
FIG. 6 is a block diagram of another embodiment of a system for dissemination of documents for synchronized navigation.

FIG. 6 shows another embodiment of a system for dissemination of documents for synchronized navigation. A library 602 may store, transmit, and synchronize navigation of reference and explanatory documents 110, 112, as discussed elsewhere herein. The library 602 may provide further functionality as discussed below.

In various examples a reference document 110 may include an embedded copy of some or all of the explanatory document 112. A consultant 604 may thus see what an inquirer 606 sees, in addition to the further information of the reference document 110. The library 602 may be configured to receive a modification to an explanatory document 112 based on user input 608 received at a consultant electronic device 104. The library 602 may store and/or execute a modification program 610, which may be communicated in whole or in part to the devices 104, 106 for local execution. Example modifications include a highlight, a graphic, or a drawn object, such as a circle or line, or other temporary modifications to draw the inquirer's attention to a certain part of the explanatory document 112. The user agent 114 of the consultant electronic device 104 may be configured to detect such a modification and communicate the modification to the library 602, which then communicates the modification to the inquirer electronic device 106 to update the explanatory document 112 at the user agent 116. A finger tap, a touch, or similar user input 608 made by the consultant 604 may be detected and then rendered as a suitable modification at the user agent 116 of the inquirer electronic device 106. This may assist the consultant 604 in communicating with the inquirer 606 and drawing attention to certain features of the explanatory document 112.

The library 602 may be configured to track user input 608, 612 by one or both of the consultant 604 and inquirer 606. The library 602 may store and/or execute a tracking program 614, which may be communicated in whole or in part to either or both of the devices 104, 106 for local execution. The tracking program 614 may track user input 612 received at the inquirer electronic device. Such user input may be a touch, a tap, eye tracking, or similar. The library 602 may display a notification 620 at the consultant electronic device in response to the user input 612 received at the inquirer electronic device 106. A notification 620 may include a message, an indicator of the location in the explanatory document 112 that the inquirer 606 has touched, tapped, or looked. This may provide further information to the consultant 604 to assist in conveying information to the inquirer 606. For example, if the inquirer 606 is looking at a certain part of the explanatory documents 112, the consultant may be informed of such and thus may anticipate a question or realize that something needs further explanation.

The library 602 may be configured to track navigational user input 608 received at the consultant electronic device 104, so as to collect information on how reference documents 110, and thus explanatory documents 112, are navigated. This information may be used to improve such documents 110, 112. Navigation of a plurality of reference documents 110 by various different consultants 604 may be tracked to determine metrics 616 for the corresponding explanatory documents 112. For example, if physicians 604 tend to frequently return to a certain page of a reference document 110, it may show that the explanatory document 112 needs improvement, as it may be the case that physicians 604 frequently return to the given page because of questions or poor understanding by the inquirer 606 who is viewing the explanatory document 112.

The library 602 may be configured to initiate display of a feedback prompt 618 at the inquirer electronic device 106 and receive a user response 612 to the feedback prompt 618. The feedback prompt 618 may explicitly require confirmation of understanding of the consultation and the content of the explanatory document. The library 602 may obtain other kinds of feedback over various ranges of time. For example, the library 602 may request and receive an indication that confirms obtention or usage by the inquirer 606 of a medical product or service described by the explanatory document 112. The library 602 may request and receive an indication from the inquirer 606 of satisfaction or usefulness of such a medical product or service. The library 602 may accordingly determine a metric 616, such as an effectiveness metric, for the corresponding reference document 110, explanatory document 112, or both.

In view of the above, it should be apparent that guided navigation of documents provides for greater understanding of complex subject matter. Further, the localized authentication of an inquirer by a consultant offers quick and convenient usage that is similar to the usage of paper/hardcopy documents, but without the drawbacks.

The library 102 and user devices 104, 106 may each include a processor that may include a central processing unit (CPU), a microcontroller, a microprocessor, a field-programmable gate array (FPGA), an application-specific integrated circuit (ASIC), or a similar device capable of executing the instructions. The library 102 and user devices 104, 106 may each include a non-transitory machine-readable medium may include an electronic, magnetic, optical, or other physical storage device that encodes instructions that implement the functionality discussed herein. The machine-readable medium may include non-volatile memory, such as read-only memory (ROM), electrically-erasable programmable read-only memory (EEPROM), or flash memory that cooperates with the processor to execute the instructions.

Instructions may be directly executed, such as binary or machine code, and/or may include interpretable code, bytecode, source code, or similar instructions that may undergo additional processing to be executed. All of such examples may be considered executable instructions.

It should be recognized that features and aspects of the various examples provided above can be combined into further examples that also fall within the scope of the present disclosure. In addition, the figures are not to scale and may have size and shape exaggerated for illustrative purposes.

We claim:

1. A non-transitory machine-readable medium comprising instructions that when executed by a processor cause the processor to:

identify a reference document comprising technical information and an associated explanatory document comprising simplified information for a layperson, the technical information containing information supporting an explanation contained in the explanatory document;

provide control of navigation of the reference document to a first electronic device;

locally authorize the second electronic device to display the explanatory document when the second electronic device is detected as physically proximate the first electronic device; and if the local authorization is successful, control passive navigation of the explanatory document at the second electronic device with active navigation of the reference document at the first electronic device.

2. The non-transitory machine-readable medium of claim 1, wherein locally authorize the second electronic device comprises display of a code at the first electronic device for capture by the second electronic device.

3. The non-transitory machine-readable medium of claim 2, wherein the display of the code comprises display of a machine-readable code.

4. The non-transitory machine-readable medium of claim 3, wherein the code comprises a QR code.

5. The non-transitory machine-readable medium of claim 1, wherein locally authorize the second electronic device comprises:

sharing of a human-intelligible code between the first electronic device and the second electronic device; and receiving manual entry of the human-intelligible code at the first electronic device, the second electronic device, or both.

6. The non-transitory machine-readable medium of claim 5, wherein the human-intelligible code is wirelessly transmitted to the second electronic device for manual entry at the second electronic device.

7. The non-transitory machine-readable medium of claim 1, wherein:

the reference document comprises a first group of pages associated with navigation logic that governs the navigation of the reference document by associating a current page with a next page;

the explanatory document comprises a second group of pages; and the first and second groups of pages are linked by synchronization logic that identifies a page of the second group of pages for each page of the first group of pages.

8. The non-transitory machine-readable medium of claim 7, wherein the navigation logic defines a linear sequence of the first group of pages.

9. The non-transitory machine-readable medium of claim 7, wherein the synchronization logic defines a one-to-one page mapping of the second group of pages to the first group of pages.

10. The non-transitory machine-readable medium of claim 1, wherein the instructions are further to:

receive a modification to the explanatory document based on user input received at the first electronic device; and communicate the modification to the second electronic device to update the explanatory document.

11. The non-transitory machine-readable medium of claim 1, wherein the instructions are further to track user input received at the second electronic device.

12. The non-transitory machine-readable medium of claim 11, wherein the instructions are further to initiate display of a notification at the first electronic device in response to a user input received at the second electronic device.

13. The non-transitory machine-readable medium of claim 1, wherein the instructions are further to:

initiate display of a feedback prompt at the second electronic device; and receive a user response to the feedback prompt.

14. The non-transitory machine-readable medium of claim 1, wherein the instructions are further to track navigational user input received at the first electronic device.

15. The non-transitory machine-readable medium of claim 1, wherein the instructions are further to:

track navigation of a plurality of reference documents that are associated with a plurality of explanatory documents; and determine a metric for the plurality of explanatory documents based on the tracked navigation of the plurality of reference documents.

16. The non-transitory machine-readable medium of claim 1, wherein the instructions are further to:

receive an indication that confirms obtention or usage by a user of the second electronic device of a product or service described by the explanatory document; and determine a metric for the reference document, the explanatory document, or both based on the indication.

17. The non-transitory machine-readable medium of claim 1, wherein the instructions are further to:

allow selection of the reference document or the explanatory document from a library; and automatically select the explanatory document or the reference document based on the selection.

18. The non-transitory machine-readable medium of claim 1, wherein the instructions are further to:

receive user input related to a characteristic of a user of the second electronic device; and select or modify the reference document, the explanatory document, or both based on the characteristic of the user.

19. The non-transitory machine-readable medium of claim 1, wherein:

the explanatory document contains information to disseminate to a patient concerning a medical product; and the reference document contains controlled information for a healthcare practitioner concerning the medical product.

20. The non-transitory machine-readable medium of claim 19, wherein the medical product comprises a medication to be prescribed.

* * * * *